United States Patent
Pettinaroli et al.

(10) Patent No.: US 9,683,677 B2
(45) Date of Patent: Jun. 20, 2017

(54) BYPASS VALVE AND HYDRAULIC UNIT INCLUDING SUCH A VALVE

(71) Applicant: FRATELLI PETTINAROLI S.p.A., San Maurizio d'Opaglio (NO) (IT)

(72) Inventors: Giulio Pettinaroli, San Maurizio d'Opaglio (IT); Sergio D'Andrea, San Maurizio d'Opaglio (IT)

(73) Assignee: FRATELLI PETTINAROLI S.P.A., D'Opaglio (IT)

( * ) Notice: Subject to any disclaimer, the term of this patent is extended or adjusted under 35 U.S.C. 154(b) by 71 days.

(21) Appl. No.: 14/840,594

(22) Filed: Aug. 31, 2015

(65) Prior Publication Data

US 2016/0061350 A1 Mar. 3, 2016

(30) Foreign Application Priority Data

Sep. 1, 2014 (IT) .......................... MI2014U0268 U

(51) Int. Cl.

| F16K 11/087 | (2006.01) |
|---|---|
| F16K 43/00 | (2006.01) |
| F16K 11/20 | (2006.01) |
| F16K 27/06 | (2006.01) |
| F16K 1/14 | (2006.01) |
| F16K 1/52 | (2006.01) |
| F16K 5/06 | (2006.01) |

(Continued)

(52) U.S. Cl.
CPC ................ *F16K 43/00* (2013.01); *F16K 1/14* (2013.01); *F16K 1/52* (2013.01); *F16K 5/06* (2013.01); *F16K 11/205* (2013.01); *F16K 27/067* (2013.01); *F16K 31/60* (2013.01); *F25B 41/04* (2013.01); *F24D 2220/0242* (2013.01)

(58) Field of Classification Search
USPC .................................... 137/597, 625.47, 887
See application file for complete search history.

(56) References Cited

U.S. PATENT DOCUMENTS 3,596,680 A * 8/1971 Adams .................... F16K 11/22
                                                                137/240
4,345,622 A * 8/1982 Henningsson .......... F16K 11/00
                                                                137/597

(Continued)

FOREIGN PATENT DOCUMENTS

DE           202 18 913           7/2003
DE       20 2009 001 923           7/2010
(Continued)

OTHER PUBLICATIONS

European Search Report dated Jan. 21, 2016, issued in corresponding European Application No. 15181676.6 (7 pages).

(Continued)

*Primary Examiner* — John Fox
(74) *Attorney, Agent, or Firm* — Nixon & Vanderhye P.C.

(57) ABSTRACT

A bypass valve is described comprising a delivery duct, a return duct and a central duct connecting the delivery and return ducts for the circulation of a heat-exchange fluid. A first ball valve is placed along the delivery duct and a second ball valve is placed along the return duct, at the intersection between the central duct and the delivery and return ducts. The rotation axes of the balls of the ball valves are perpendicular to each other.

8 Claims, 9 Drawing Sheets

(51) Int. Cl.
*F16K 31/60* (2006.01)
*F25B 41/04* (2006.01)

(56) References Cited

U.S. PATENT DOCUMENTS

| | | | | |
|---|---|---|---|---|
| 4,479,459 | A * | 10/1984 | Piper | F22B 37/545 |
| | | | | 122/379 |
| 4,489,721 | A * | 12/1984 | Ozaki | A61M 16/0463 |
| | | | | 128/205.24 |
| 5,533,549 | A | 7/1996 | Sherman | |
| 6,675,832 | B1 | 1/2004 | Tran et al. | |
| 8,695,642 | B2 * | 4/2014 | Danielson | F16K 11/20 |
| | | | | 137/881 |
| 8,789,560 | B2 * | 7/2014 | Holley | F16K 11/165 |
| | | | | 137/597 |
| 2014/0263360 | A1 | 9/2014 | Malnou | |

FOREIGN PATENT DOCUMENTS

| | | |
|---|---|---|
| EP | 2 085 670 | 8/2009 |
| EP | 2 990 702 | 3/2016 |
| FR | 2 981 720 | 4/2013 |
| GB | 2 510 119 | 7/2014 |
| WO | WO 2005/031200 | 4/2005 |
| WO | WO 2013/142833 | 9/2013 |

OTHER PUBLICATIONS

"FlowCon Mini By-Pass Unit, 3 Way Mini By-Pass Unit," *Tech note, FlowCon International*, www.flowcon.com, pp. 1-3, (Mar. 2014).

* cited by examiner

BYPASS VALVE AND HYDRAULIC UNIT INCLUDING SUCH A VALVE

This application claims priority to IT Patent Application No. MI2014U000268 filed 1 Sep. 2014, the entire content of which is hereby incorporated by reference.

The present invention concerns a bypass valve and a hydraulic unit comprising this valve for connecting a terminal unit, for example a fan coil or the like, to an air conditioning system in which a heat-exchange fluid circulates.

Bypass valves are commonly used for isolating a terminal unit from the rest of the system so as to interrupt the circulation of the heat-exchange fluid in the unit without interrupting the circulation of the same fluid in the rest of the system. For example, this allows the maintenance and cleaning of each of the terminal units to be carried out without having to drain the heat exchange fluid from the rest of the system.

Furthermore, it is possible to disable one or more terminal units in case they are not needed, for example in order to reduce power consumption, or else in case of malfunctions of one or more terminal units, for example to temporarily cut them off from the circuit while waiting for an intervention of specialized staff.

Bypass valves intended for this purpose are already known and widely used in the art. The valves of the known type generally comprise a delivery duct and a return duct for a heat exchange fluid. The two delivery and return ducts are connected through a central duct and can be fluidically connected to each other or isolated by operating a pair of valves.

Some products available on the market use two ball valves arranged along the delivery and return ducts, possibly also at the intersection between these and the central duct.

However, in these kinds of products the overall size of the bypass valve has to be limited, especially by reducing the length of the central duct. Indeed, it should be considered that the terminal units and the related hydraulic units connecting them to the system are often installed in locations hardly accessible by the operators and that, frequently, each terminal unit is provided by a hydraulic unit connecting it to a heating circuit and a distinct hydraulic unit connecting it to a cooling circuit.

However, this requires also to limit the size of any possible lever or control knob of the valves, thus making difficult to operate the valves themselves.

It is therefore an object of the present invention to overcome the drawbacks of the known art by providing a bypass valve which is easy to be operated.

It is another object of the present invention to provide a bypass valve which is anyway small sized.

It is a further object of the present invention to provide a bypass valve that can also be installed in side-by-side hydraulic units, without preventing or hindering the operation of the valves.

These and other objects are achieved by the present invention by means of a bypass valve according to claim 1 and the respective dependent claims.

A bypass valve generally comprises a delivery duct and a return duct for a heat-exchange fluid, a first ball valve placed along the delivery duct, a second ball valve placed along the return duct, and a central duct connecting the delivery and return ducts to each other at the ball valves.

In the preferred embodiment of the present invention, the axes of the balls of the ball valves are perpendicular to each other. This advantageously allows the use of control knobs and/or levers having greater size with respect to known ones, the operation thereof being therefore allowed without any mutual interference between their movements. Another advantage resulting from this arrangement is that it is easy to recognize the two valves, thereby making interventions easier for the operators when any one among the several combinations of routing the fluid with respect to the circuit and the terminal unit has to be selected.

In a possible embodiment, the delivery duct, the return duct and the central duct connecting them are made integral in a single body. In fact, another advantage proposed by the solution provided by the present invention is that two different versions of bypass valves, specular to each other, can be obtained from a single body and, therefore, be installed on two hydraulic units placed side by side in very close proximity.

Not only this is particularly useful in the manufacturing step, in which only a single blank has to be machined in order to obtain both types of valves, but also in the installation and intervention step of the conditioning terminal units connected to heating and cooling distinct circuits.

In the bypass valve according to the invention, inside each of the two ball valves there is a main channel having its axis perpendicular to the rotation axis of the ball and arranged between two opposite inlet/outlet ports for the heat-exchange fluid. At least one first auxiliary channel having its axis coincident with the rotation axis of the ball allows the main channel to be fluidically connected to a third inlet/outlet port for the fluid.

Both balls may be obtained by the same machining operations, thus obtaining a basic model that can be used for both valves. At least one of the balls further comprises a second auxiliary channel having its axis perpendicular to the axis of the main channel and to the rotation axis of the ball for fluidically connecting the main channel and the first auxiliary channel with a fourth inlet/outlet port for the heat exchange fluid.

Therefore, in order to obtain both the balls used in the bypass valve according to the invention, this involves a single additional machining with respect to the ball made as a basic model.

The invention further relates to a hydraulic unit in which a bypass valve, as the above mentioned one, is installed. Among the various components interconnected in the hydraulic unit, in addition to the bypass valve, at least one balancing valve is provided and connected along at least one of the delivery and return ducts, for example along the delivery duct downstream of the bypass valve.

A removable Venturi device is instead connected along at least one of the delivery and return ducts, for example along the return duct upstream of the bypass valve. In this way, the operation of the balancing valve can be controlled at any time, without having to interrupt the operation of the system. Furthermore, due to the possibility of changing the device provided with the Venturi orifice, thereby allowing the hole diameter to be changed in a few minutes, a greater degree of flexibility is provided during the installation steps.

Further aspects and advantages of the present invention will become more evident from the following description, made for illustration purposes and without limitation, with reference to the accompanying schematic drawings, in which.

Figure 7A:
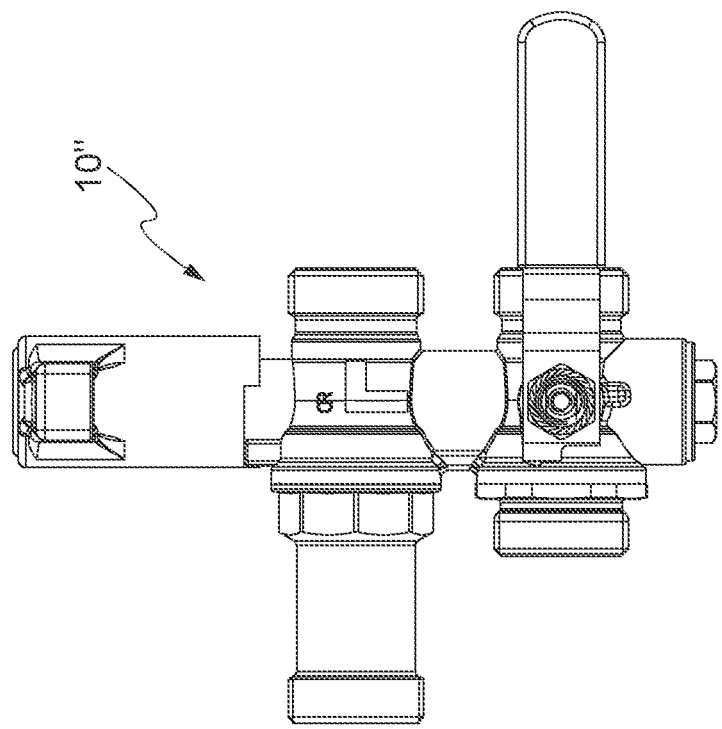
Figure 7B:
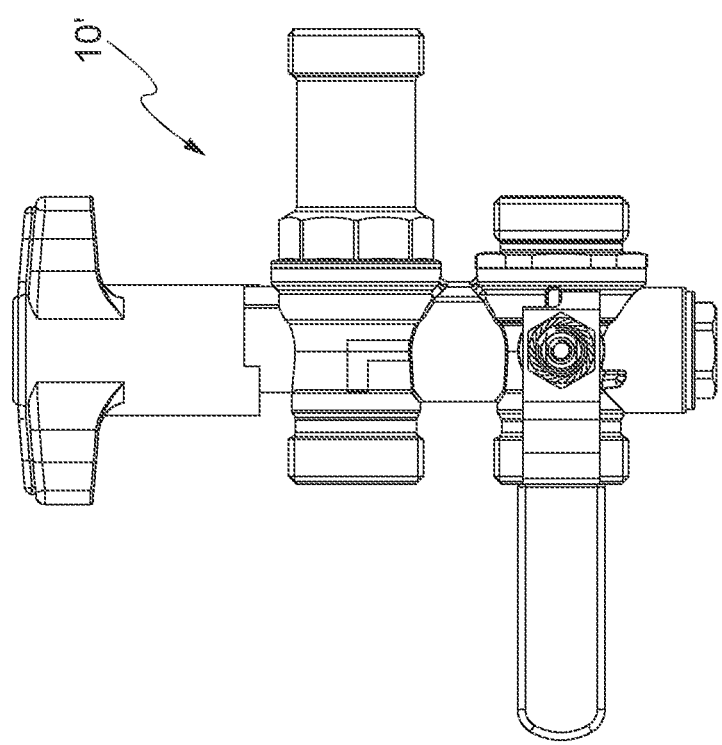
Figure 8:
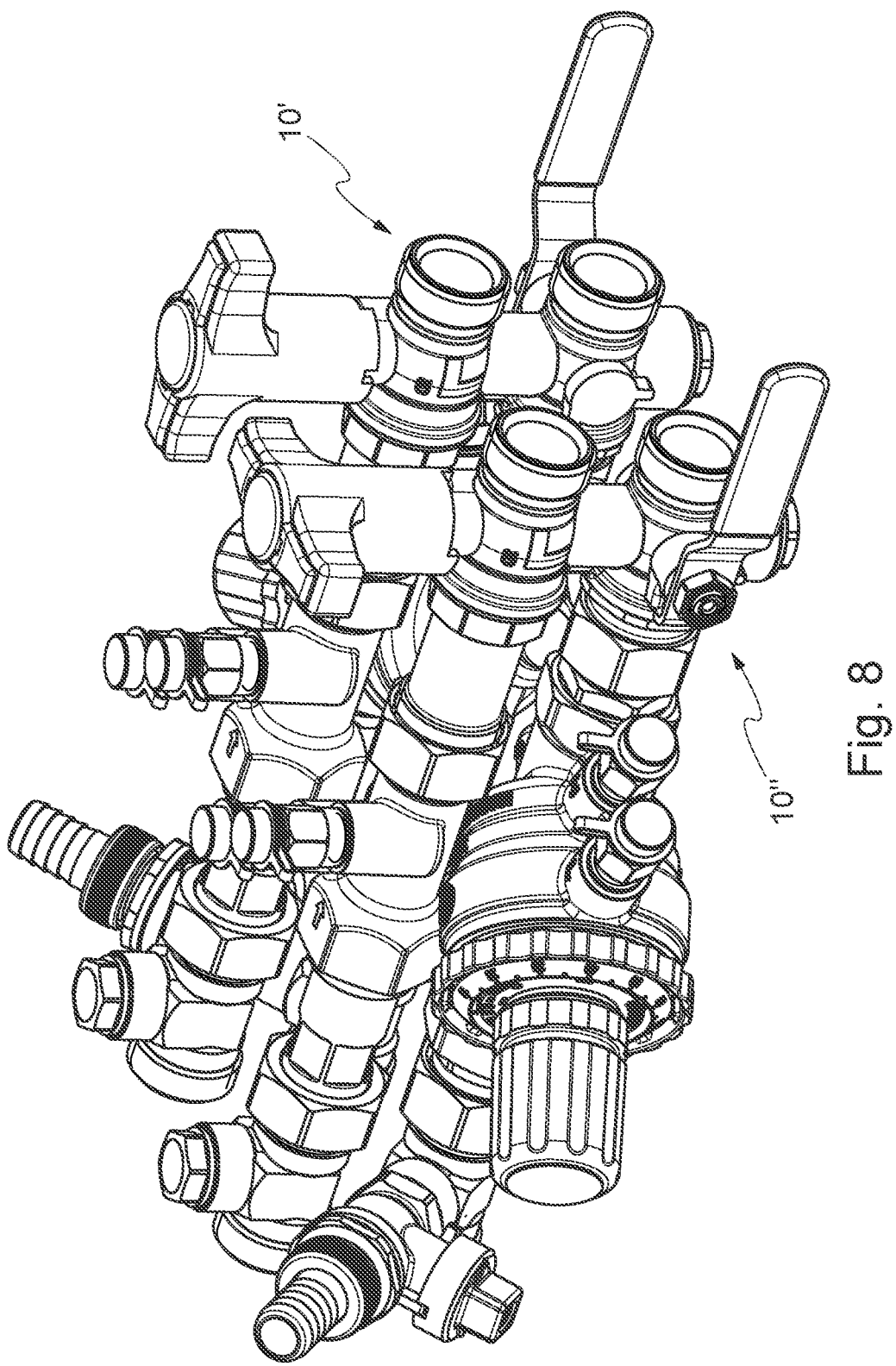

FIGS. 7A and 7B show two embodiments of the bypass valve according to the invention, respectively in a right and left installed configurations, both able to be obtained from the same blank; and FIG. 8 is a perspective view of two hydraulic units comprising the bypass valves of the two configurations shown in FIGS. 7A and 7B for connecting a terminal unit to the heating and cooling separate circuits in an air conditioning system.

Figure 1:
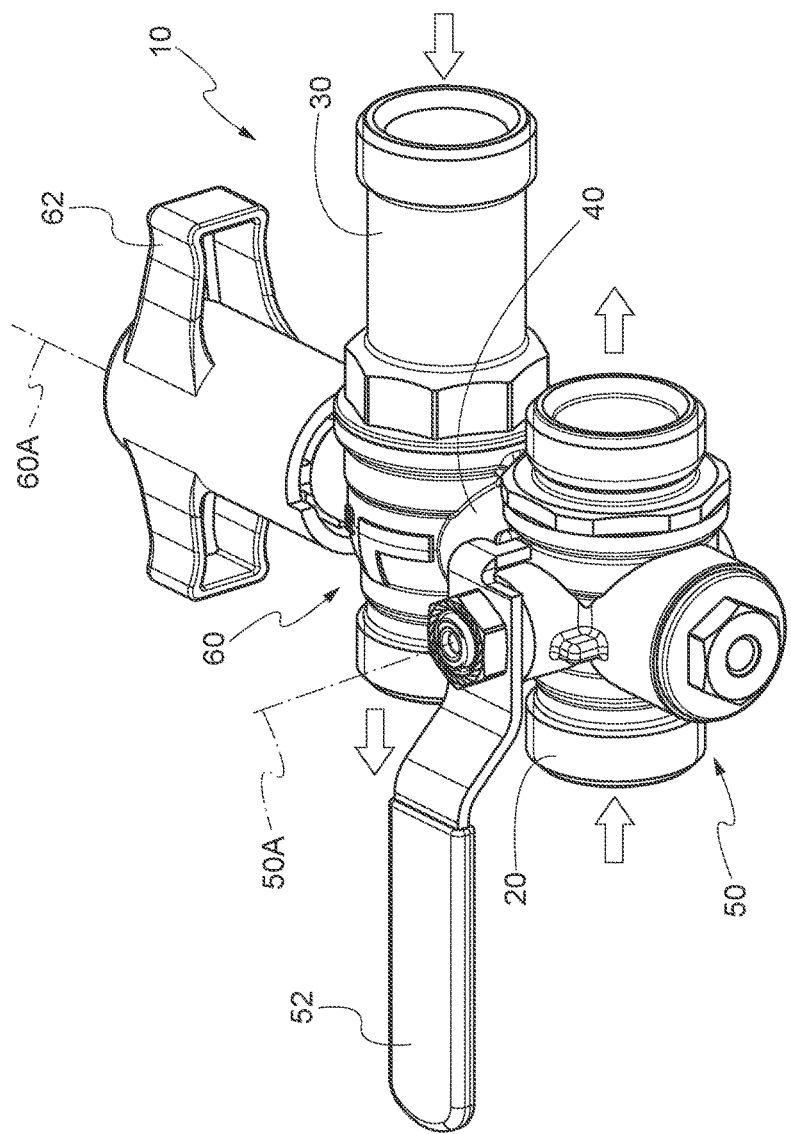
FIG. 1 is a perspective view of a bypass valve according to an embodiment of the present invention.

The bypass valve 10 depicted in FIG. 1 comprises a delivery duct 20, a return duct 30 and a central duct 40 connecting the ducts 20 and 30 to each other. In the view of FIG. 1, the bypass valve 10 is connected to the system circuit at the left side and to the terminal unit at the right side.

A first ball valve 50 is arranged along the delivery duct 20 at the intersection with the central duct 40, and a second ball valve 60 is arranged along the return duct 30 at the intersection with the central duct 40.

The ball valve 50 can be manually operated by means of a lever 52 rotatable around an axis 50A, whereas the ball valve 60 can be manually operated by means of a knob 62 rotatable around an axis 60A, the latter being perpendicular to the axis 50A of the valve 50. The opening and closing positions of the valves 50 and 60 are angularly spaced by 90° with respect to each other.

Figure 2:
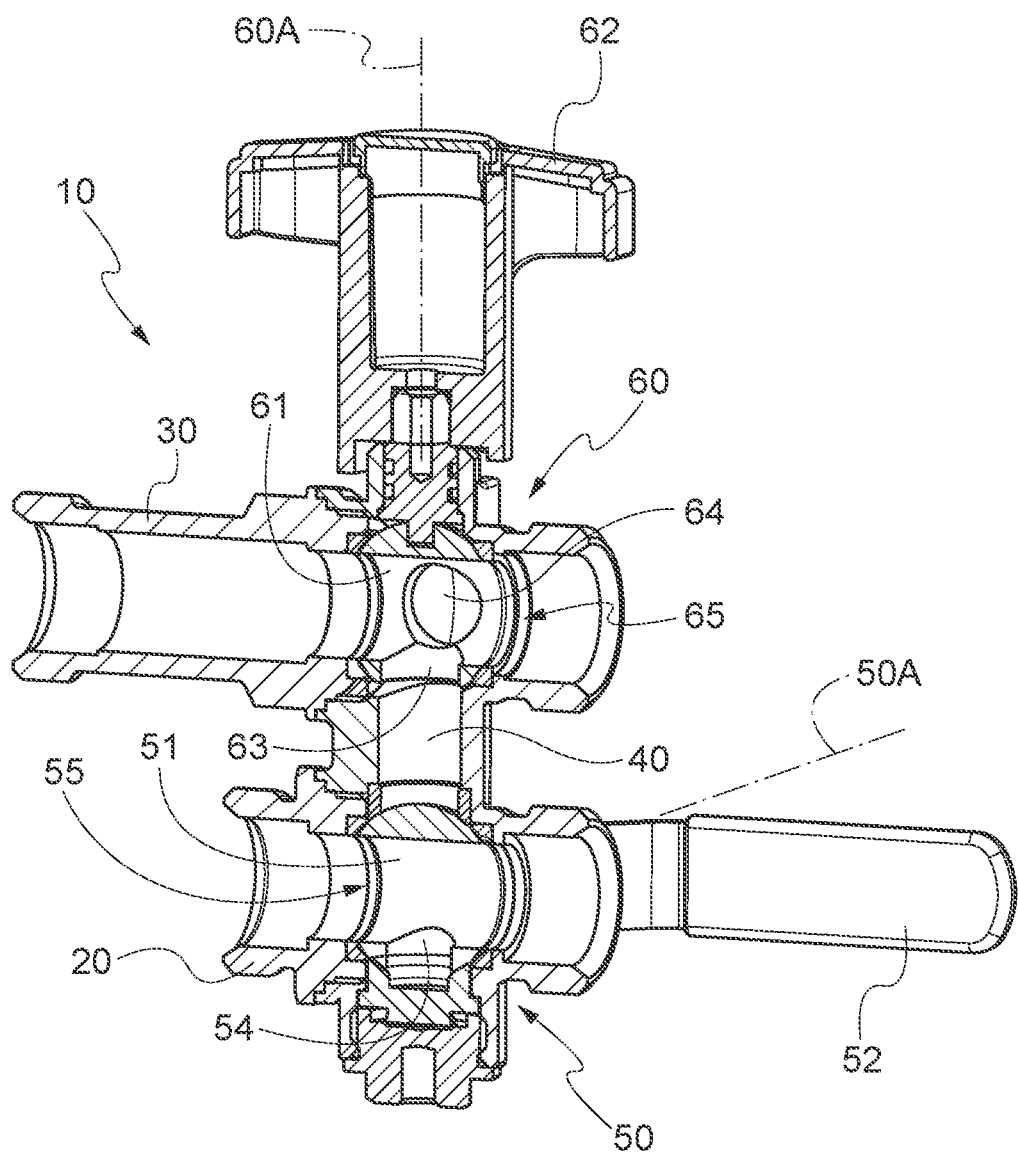
FIG. 2 is a sectional view of the valve of FIG. 1 in the normal operating condition.

The bypass valve 10 is depicted in the view of FIG. 2 in a normal operating condition, i.e. in the condition of circulating the heat exchange fluid in the terminal unit connected to the air conditioning system.

In the valve 50 placed along the delivery duct 20 there is a ball 55 rotating around the axis 50A, including in its inside a main channel 51 passing through the ball from side to side, i.e. the main channel being arranged between two opposite inlet/outlet ports, and a first auxiliary channel 54 fluidically connecting the main channel 51 to a third inlet/outlet port. Both the channels 51 and 54 extend along axes perpendicular to the rotation axis 50A of the ball 55.

Also in the valve 60 placed along the delivery duct 30 there is a ball 65 rotatable around the axis 60A, including in its inside a main channel 61 passing through the ball from side to side, i.e. the main channel being arranged between two opposite inlet/outlet ports, and a first auxiliary channel 64 fluidically connecting the main channel 61 to a third inlet/outlet port. Both the channels 61 and 64 extend along axes perpendicular to the rotation axis 60A of the ball 65. The ball 65 further comprises a second auxiliary channel 63 having the axis coincident with the rotation axis 60A of the ball 65 for fluidically connecting the main channel 61 and the first auxiliary channel 64 to a fourth inlet/outlet port.

In the normal operating condition depicted in FIG. 2, the heat exchange fluid coming from the system circuit enters the delivery duct 20 (from the right side in FIG. 2), flows through the main channel 51 of the ball 55, is supplied to the terminal unit (connected on the left side in FIG. 2, although not expressly shown), goes back to the return duct 30 (still on the left side) flows through the main channel 61 of the ball 65 and then goes back to the circuit which is connected to the return duct 30 (on the right side in FIG. 2). Then, the central duct 40 is not involved in the circulation of the heat exchange fluid.

Figure 3:
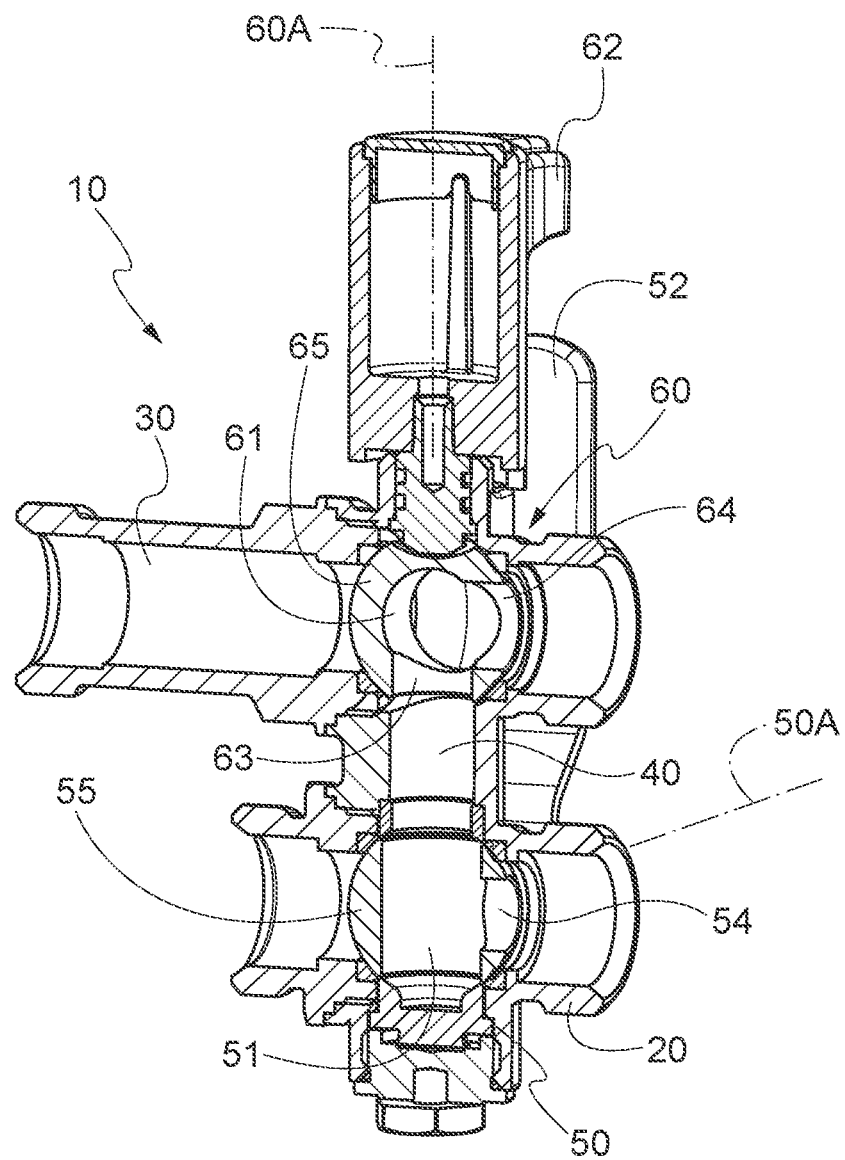
FIG. 3 is a sectional view of the valve of FIG. 1 in the bypass condition.

In the view of FIG. 3 the valve 10 is instead shown in bypass condition, i.e. having the balls 55 and 65 rotated by 90°. The fluid enters the delivery duct 20 (from the right side in FIG. 3), flows through the auxiliary channel 54 and the main channel 51 that leads it towards the central duct 40 while blocking the path towards the outlet of the delivery duct 20 connected to the terminal unit. Therefore, the fluid flows through the central duct 40, enters the second auxiliary channel 63 of the ball 65 and is led towards the first auxiliary channel 64, the latter leading it to the outlet of the return duct 30 (right side in FIG. 3) and then to the circuit of the conditioning system. In this condition the terminal unit, which is connected on the left side in FIG. 3, is cut off from the circulation of the fluid, thus being isolated from the rest of the circuit.

Figure 4:
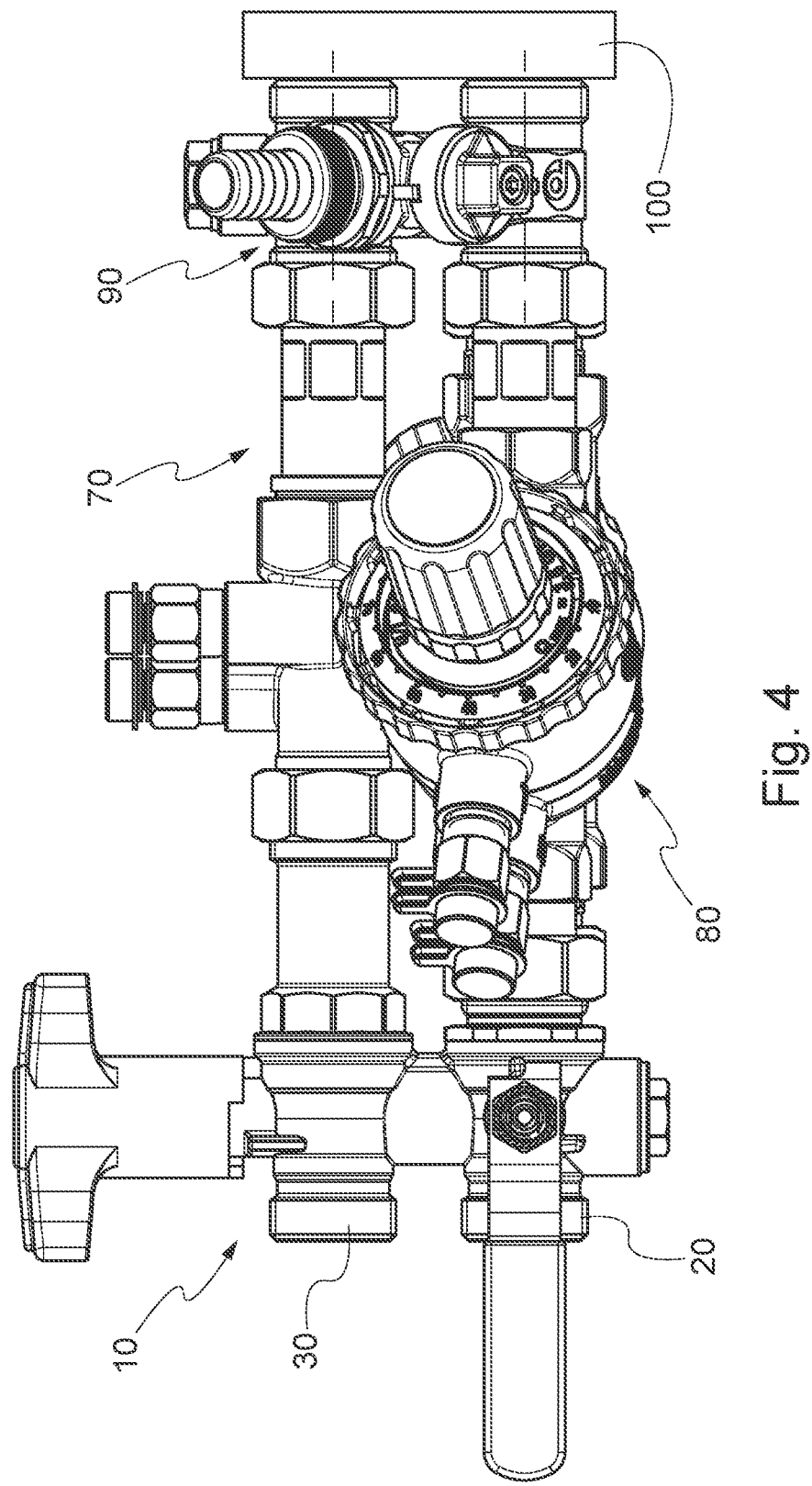
FIG. 4 is a plan view of a hydraulic unit including a bypass valve according to the invention for connecting a terminal unit to an air conditioning system.
Figure 5:
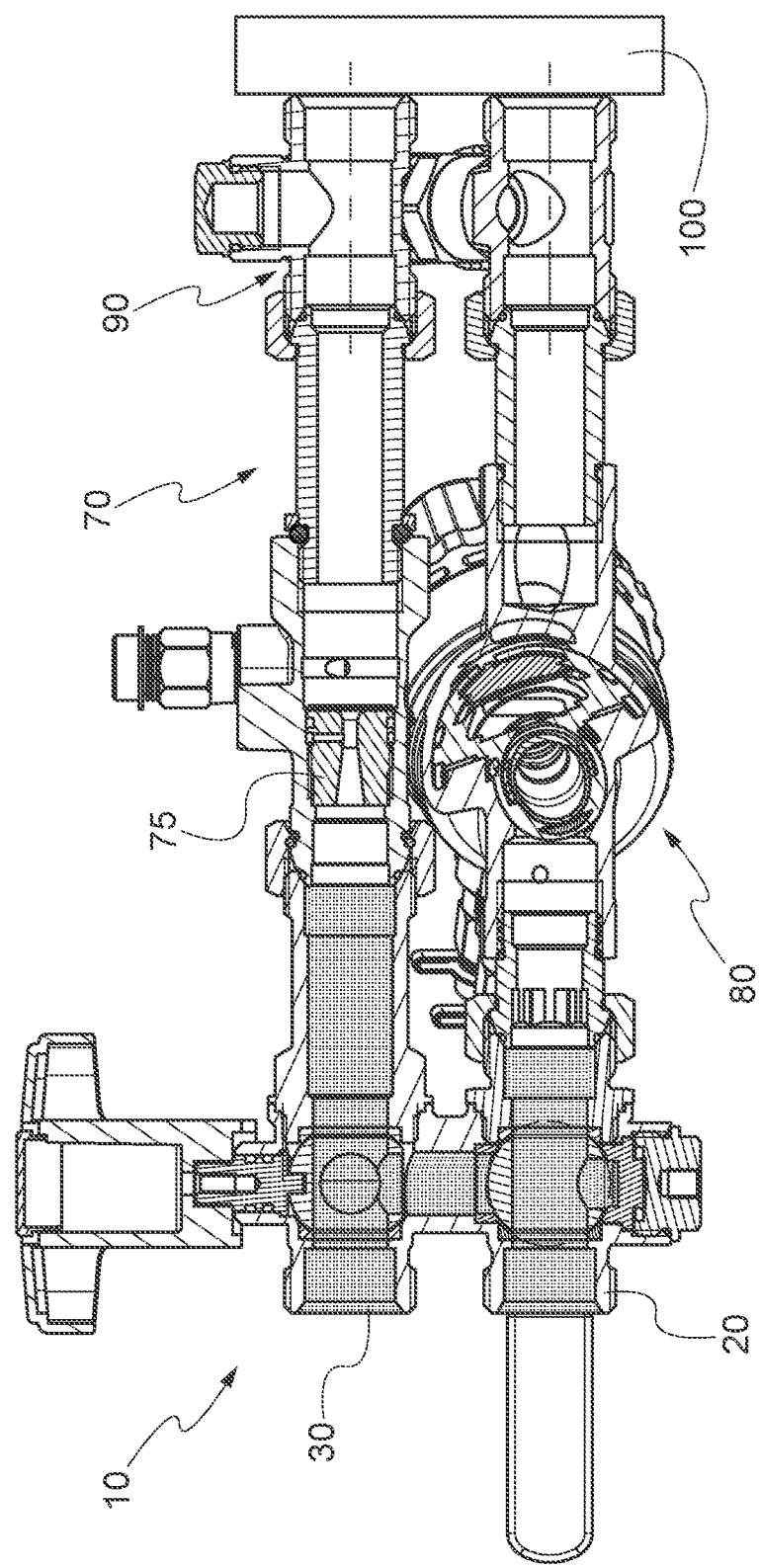
FIG. 5 is a sectional bottom view of the hydraulic unit depicted in FIG. 4.

FIGS. 4 and 5 show a hydraulic unit 70 allowing a terminal unit 100 to be connected to a conditioning system through a bypass valve 10 according to the invention. The hydraulic unit 70 comprises a balancing valve 80 for example connected along the delivery duct, and a removable Venturi device 75 (shown in the sectional view of FIG. 5) connected along the return duct. The removable device 75 allows checking the proper operation of the balancing valve 80 and turns out to be particularly useful during installation steps. Furthermore, in the hydraulic unit 70 there is a drain valve 90 allowing to carry out the various cleaning operations of the terminal unit 100.

FIGS. 6A-6D show the possible use configurations of a valve 10 included in a hydraulic unit 70 for connecting a terminal unit 100.

Figure 6A:
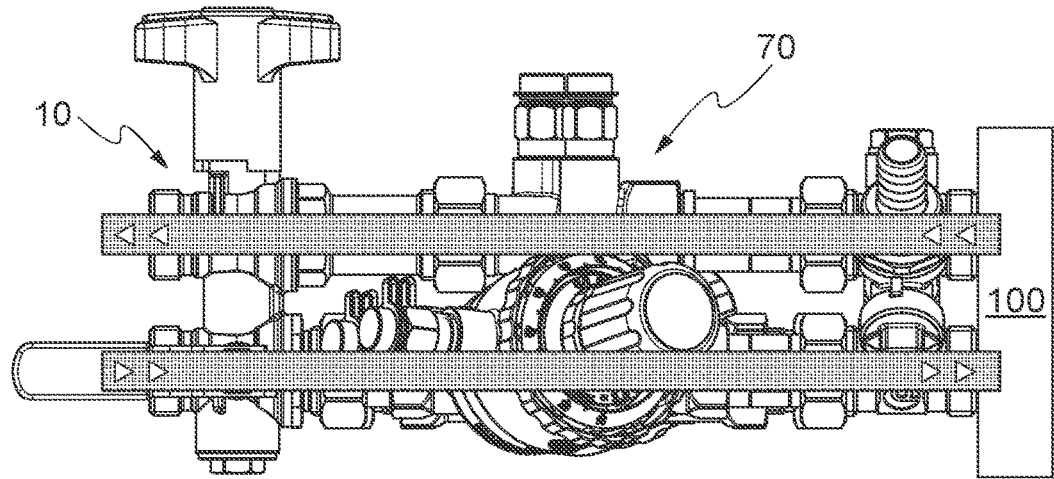
FIGS. 6A-6D show different configurations of use for a bypass valve according to the invention.

FIG. 6A shows the normal use condition, where the ball valves 50 and 60 are positioned as depicted in FIG. 2. In this position, the heat exchange fluid reaches the hydraulic unit 70 from the delivery duct 20 of the bypass valve 10, flows through the terminal unit 100 and goes back to the circuit through the return duct 30 of valve 10.

Figure 6B:
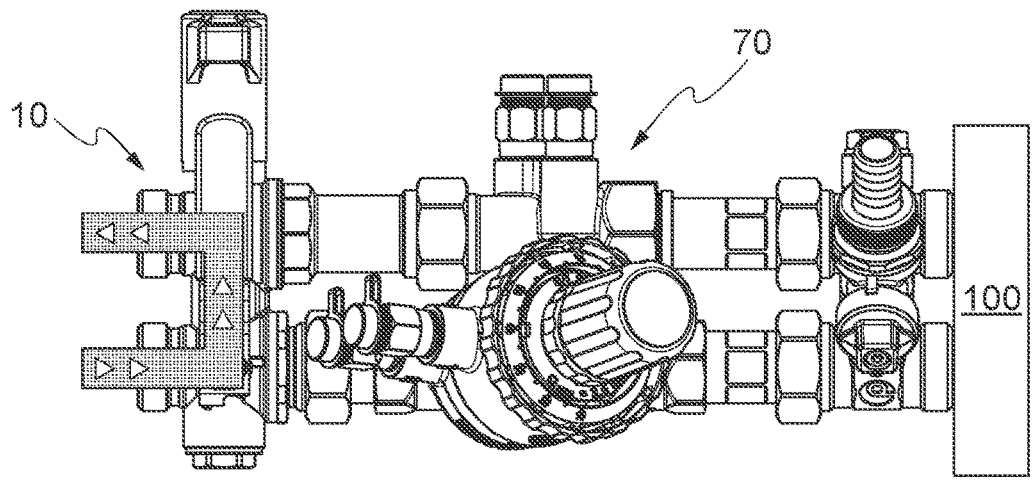

On the other hand, FIG. 6B shows the bypass condition corresponding to the position of the valves 50 and 60 depicted in FIG. 3. In this way, the fluid flows from the delivery duct to the return duct through the central channel 40 of the bypass valve 10, causing the terminal unit 100 to be isolated from the circuit. It is therefore possible to work on the terminal unit 100 during servicing without involving the rest of the system.

Figure 6C:
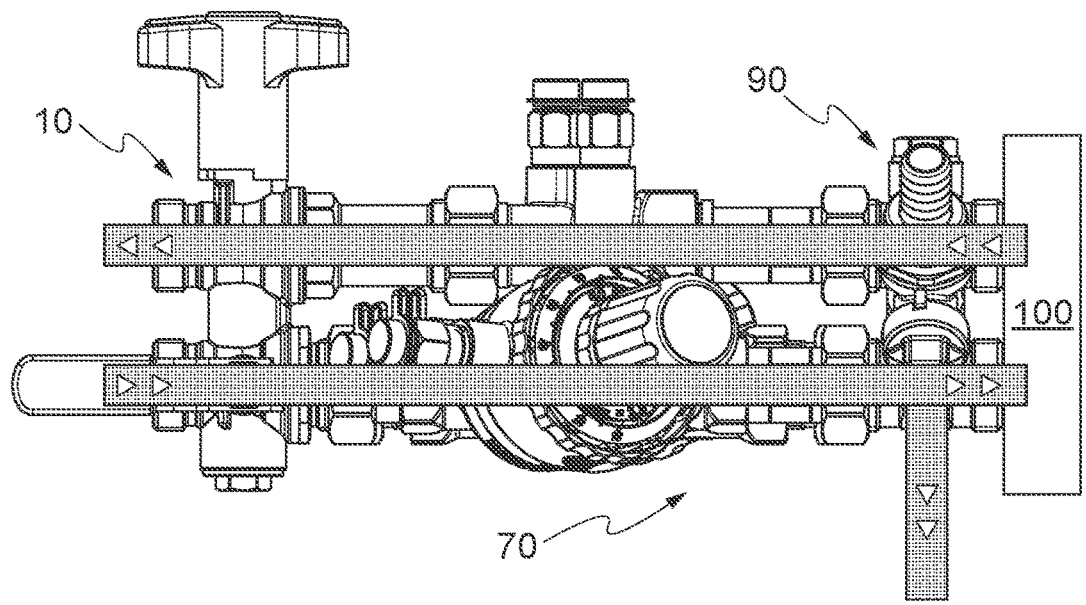

FIG. 6C shows the condition in which the terminal unit 100 is directly washed: in this condition, the valves 50 and 60 of the bypass valve 10 are in the same normal operating condition but, in addition, the drain valve 90 of the hydraulic unit 70 is opened so that the fluid in the circuit of the conditioning system and in the terminal unit 100 is caused to flow and is drained.

Figure 6D:
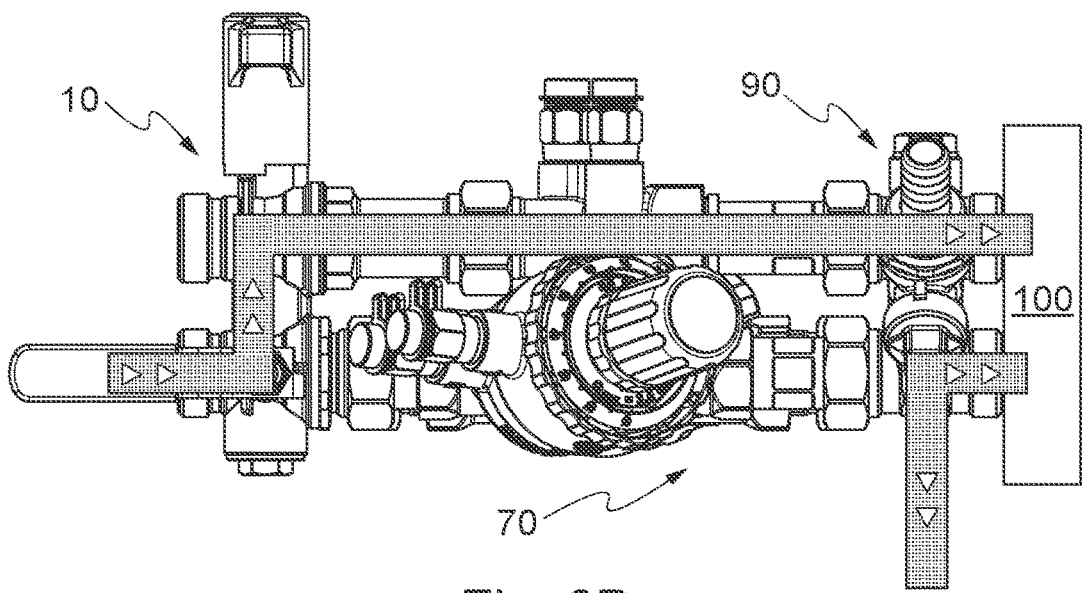

FIG. 6D shows the condition of countercurrent washing. In this case, the ball valve 50 along the delivery duct 20 is closed, while the ball valve 60 of the bypass valve 10 and the drain valve 90 of the hydraulic unit 70 are still opened. Thus, the fluid entering the bypass valve 10 flows through the central duct 40 and is directed to the terminal unit 100 through the return duct, though with a flow direction opposite to the normal one, and is finally drained through the drain valve 90.

FIGS. 7A and 7B show two bypass valves 10' and 10" according to the invention, both made from a single body allowing a bypass valve 10' having a right configuration and a valve 10" having a left configuration to be obtained by few machining operations.

In fact, as depicted in FIG. 8, the by-pass valves 10' and 10" may be mounted on side-by-side hydraulic units connecting the same terminal unit to heating and cooling distinct circuits of an air conditioning system. Thanks to the small size of the bypass valves 10' and 10" according to the invention, it is possible to easily carry out this type of installations, further making easier to manipulate the various valves 50 and 60.

Several modifications can be provided with respect to the embodiments described herein without departing from the scope of the present invention. For example, the various types of control members shown herein, such as levers 52 and knobs 62, can also be different from those depicted.

The invention claimed is:

1. A bypass valve comprising a delivery duct and a return duct for a heat-exchange fluid, a first ball valve placed along the delivery duct, a second ball valve placed along the return duct, and a central duct connecting said delivery and return ducts at said ball valves, characterized in that the rotation axes of the balls of said ball valves are perpendicular to each other.

2. The bypass valve according to claim 1, in which the delivery duct, the return duct and the central duct connecting them are made in a single body.

3. The bypass valve according to claim 1, wherein the valve is made in two versions specular to each other, starting from the same single rough body.

4. The bypass valve according to claim 1, wherein inside each ball of said ball valves there is a main channel arranged between two opposite inlet/outlet ports for said heat-exchange fluid, and at least one first auxiliary channel fluidically connecting said main channel to a third inlet/outlet port for said fluid, the axes of said main channel and said auxiliary channel being perpendicular to the rotation axis of the ball.

5. The bypass valve according to claim 4, wherein at least one of said balls further comprises a second auxiliary channel having the axis coincident with the rotation axis of the ball in order to fluidically connect said main channel and said first auxiliary channel to a fourth inlet/outlet port for said heat-exchange fluid.

6. A hydraulic unit for connecting a terminal unit of an air conditioning system by means of delivery and return ducts, characterized by comprising a bypass valve according to claim 1.

7. The hydraulic unit according to claim 6, wherein at least one balancing valve is connected along at least one of the delivery and return ducts.

8. The hydraulic unit according to claim 6, wherein at least one removable Venturi device is connected along at least one of the delivery and return ducts.

* * * * *